US010431392B2

(12) United States Patent
Kubo et al.

(10) Patent No.: US 10,431,392 B2
(45) Date of Patent: *Oct. 1, 2019

(54) ELECTRICAL STORAGE DEVICE, MANUFACTURING METHOD OF THE SAME, AND SEPARATOR

(71) Applicant: PANASONIC INTELLECTUAL PROPERTY MANAGEMENT CO., LTD., Osaka (JP)

(72) Inventors: Daisuke Kubo, Osaka (JP); Masayuki Takahashi, Kyoto (JP); Yukihiro Shimasaki, Hyogo (JP); Tomoyuki Tashiro, Yamaguchi (JP); Tatsuji Aoyama, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,072

(22) Filed: Dec. 13, 2017

(65) Prior Publication Data

US 2018/0108490 A1    Apr. 19, 2018

Related U.S. Application Data

(63) Continuation of application No. 15/049,143, filed on Feb. 22, 2016, now Pat. No. 9,875,853, which is a
(Continued)

(30) Foreign Application Priority Data

Sep. 9, 2013  (JP) ................................. 2013-185877

(51) Int. Cl.
   *H01G 9/15*      (2006.01)
   *H01G 9/02*      (2006.01)
   (Continued)

(52) U.S. Cl.
   CPC .......... *H01G 9/151* (2013.01); *H01G 9/0029* (2013.01); *H01G 9/02* (2013.01); *H01G 9/028* (2013.01);
   (Continued)

(58) Field of Classification Search
   CPC ........ H01G 9/151; H01G 9/0029; H01G 9/02; H01G 9/028; H01G 9/048; H01G 9/07; H01G 13/04
   See application file for complete search history.

(56) References Cited

U.S. PATENT DOCUMENTS 9,875,853 B2 *  1/2018  Kubo ....................... H01G 9/02
2002/0117394 A1   8/2002  Morokuma et al.
(Continued)

FOREIGN PATENT DOCUMENTS

JP   07-283086 A   10/1995
JP   10-261549 A    9/1998
(Continued)

OTHER PUBLICATIONS

International Search Report of PCT application No. PCT/JP2014/004547 dated Dec. 9, 2014.
(Continued)

*Primary Examiner* — Dion Ferguson
(74) *Attorney, Agent, or Firm* — McDermott Will & Emery LLP

(57) ABSTRACT

An electrical storage device includes an electrical storage element and an electrolytic solution. The electrical storage element is formed of an anode body, a cathode body facing the anode body, and a separator interposed between the anode body and the cathode body. The separator includes a separator substrate and a conductive polymer adhering to the separator substrate. The electrical storage element is impregnated with the electrolytic solution. The separator includes a first surface layer having a first surface facing the anode body and a second surface layer having a second surface facing the cathode body. The first surface layer includes a first region that is not provided with the conductive polymer,
(Continued)

and the second surface layer includes a second region provided with the conductive polymer.

29 Claims, 12 Drawing Sheets

Related U.S. Application Data continuation of application No. PCT/JP2014/004547, filed on Sep. 4, 2014.

(51) Int. Cl.
  *H01G 9/00* (2006.01)
  *H01G 9/028* (2006.01)
  *H01G 9/048* (2006.01)
  *H01G 9/07* (2006.01)
  *H01G 13/04* (2006.01)
  *H01G 9/035* (2006.01)

(52) U.S. Cl.
  CPC ............. *H01G 9/035* (2013.01); *H01G 9/048* (2013.01); *H01G 9/07* (2013.01); *H01G 13/04* (2013.01)

(56) References Cited

U.S. PATENT DOCUMENTS

| | | |
|---|---|---|
| 2008/0316679 A1 | 12/2008 | Sugihara et al. |
| 2009/0144954 A1 | 6/2009 | Furusawa et al. |
| 2013/0027847 A1 | 1/2013 | Aoyama et al. |
| 2013/0059064 A1 | 3/2013 | Majima et al. |
| 2016/0172117 A1* | 6/2016 | Kubo .................... H01G 9/02 361/525 |

FOREIGN PATENT DOCUMENTS

| | | |
|---|---|---|
| JP | 2006-080112 A | 3/2006 |
| JP | 2006-108650 A | 4/2006 |
| JP | 2006-269500 A | 10/2006 |
| JP | 2007-129126 A | 5/2007 |

OTHER PUBLICATIONS

Notice of Allowance issued in U.S. Appl. No. 15/049,143, dated Sep. 25, 2017.

* cited by examiner

ELECTRICAL STORAGE DEVICE, MANUFACTURING METHOD OF THE SAME, AND SEPARATOR

RELATED APPLICATIONS

This application is a Continuation application of U.S. patent application Ser. No. 15/049,143, filed on Feb. 22, 2016, which is a Continuation of International Patent Application No. PCT/JP2014/004547, filed on Sep. 4, 2014, which in turn claims the benefit of Japanese Application No. 2013-185877, filed on Sep. 9, 2013, the entire disclosures of which Applications are incorporated by reference herein.

BACKGROUND

1. Technical Field

The present disclosure relates to an electrical storage device that is used for various electronic devices, industrial apparatuses, or apparatuses for automobiles, and includes both a conductive separator and an electrolytic solution. The present disclosure also relates to the separator and a manufacturing method of the electrical storage device.

2. Description of the Related Art

With increase in the frequencies of electronic devices, an electrolytic capacitor having a large capacity and excellent equivalent-series-resistance (hereinafter referred to as "ESR") characteristics in a high frequency region is also demanded as one of the electronic storage devices. Recently, in order to reduce the ESR in such a high frequency region, a solid electrolytic capacitor that employs a solid electrolyte as the electrolyte has been studied and commercialized. The solid electrolyte, for example, includes a conductive polymer that has an electric conductivity higher than that of a conventional electrolytic solution. In order to respond to the needs for large capacity, a winding-type solid electrolytic capacitor has been commercialized which has the following structure: a conductive polymer is filled into a capacitor element that is formed by winding an anode foil and a cathode foil via a separator therebetween.

However, the above-mentioned solid electrolytic capacitor employs, as the electrolyte, only a solid electrolyte which has a low capability of repairing the dielectric oxide film. Therefore, compared with an electrolytic capacitor employing a conventional electrolytic solution, leak current tends to be increased and a short-circuit failure is apt to be caused by the occurrence of a dielectric oxide film defect in the solid electrolytic capacitor. Therefore, it is difficult to produce a capacitor having a high withstand voltage.

Meanwhile, in order to reduce the above-mentioned problem, a winding-type electrolytic capacitor employing, as the electrolyte, both of an electrolytic solution and a solid electrolyte made of a conductive polymer is proposed. This electrolytic capacitor employs, as a separator substrate, separator paper such as Manila paper or kraft paper, a porous film, and a synthetic fiber non-woven fabric. A capacitor element is formed in the following processes: the separator substrate is made conductive by a conductive polymer that is produced by chemical-oxidative-polymerizing a monomer using persulfate as the oxidant and dopant; and the separator made conductive (hereinafter referred to as "conductive separator") is interposed between an anode foil and a cathode foil. The capacitor element produced in those processes is impregnated with an electrolytic solution and is used (for example, Unexamined Japanese Patent Publication No. H7-283086).

SUMMARY

The present disclosure provides an electrical storage device that employs a conductive separator and has a high withstand voltage characteristic, and provides a manufacturing method of the electrical storage device.

The electrical storage device of the present disclosure includes an electrical storage element and an electrolytic solution. The electrical storage element is formed of an anode body, a cathode body facing the anode body, and a separator interposed between the anode body and the cathode body. The separator includes a separator substrate and a conductive polymer adhering to the separator substrate. The electrical storage element is impregnated with the electrolytic solution. The separator includes a first surface layer having a first surface facing the anode body and a second surface layer having a second surface facing the cathode body. The first surface layer has a first region that is not provided with the conductive polymer, and the second surface layer has a second region provided with the conductive polymer.

The manufacturing method of the electrical storage device of the present disclosure includes the following steps:

(1) forming a separator having an anode facing surface and a cathode facing surface by making a conductive polymer adhere to a separator substrate that has a first surface and a second surface;

(2) producing an electrical storage element by confronting an anode with the anode facing surface of the separator and confronting a cathode with the cathode facing surface of the separator; and (3) impregnating the electrical storage element with an electrolytic solution. In forming the separator, a liquid agent, which is a solution or dispersion liquid of the conductive polymer, is applied to at least one of the first surface and second surface of the separator substrate so as to infiltrate into the separator substrate, and then a solvent or dispersion medium included in the liquid agent is volatized.

The electrical storage device and the manufacturing method thereof in the present disclosure can improve the withstand voltage characteristic.

DETAILED DESCRIPTION OF EMBODIMENTS

Figure 1:
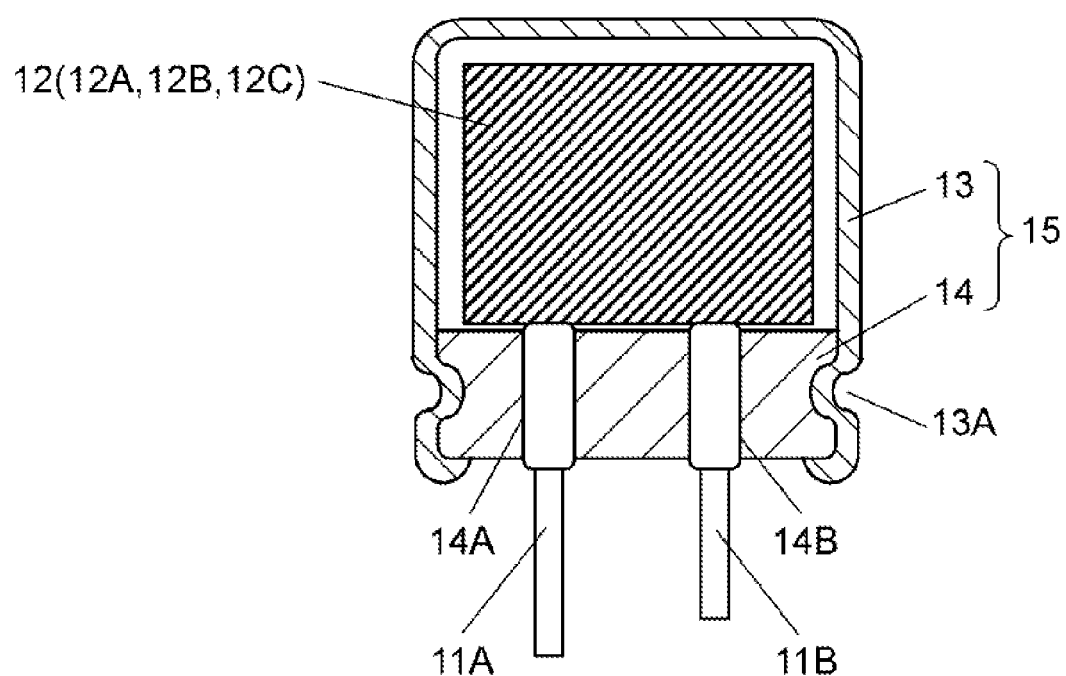
FIG. 1 is a sectional view of an electrical storage device in accordance with first, second, and third exemplary embodiments of the present disclosure.

Prior to the description of exemplary embodiments of the present disclosure, a problem of a conventional technology is briefly described. In an electrolytic capacitor using a conventional conductive separator, the withstand voltage characteristic cannot be sufficiently improved. Hereinafter, the exemplary embodiments of the present disclosure are described with reference to the accompanying drawings. In the drawings, the dimensions are changed for the sake of clarity.

First Exemplary Embodiment

Figure 2A:
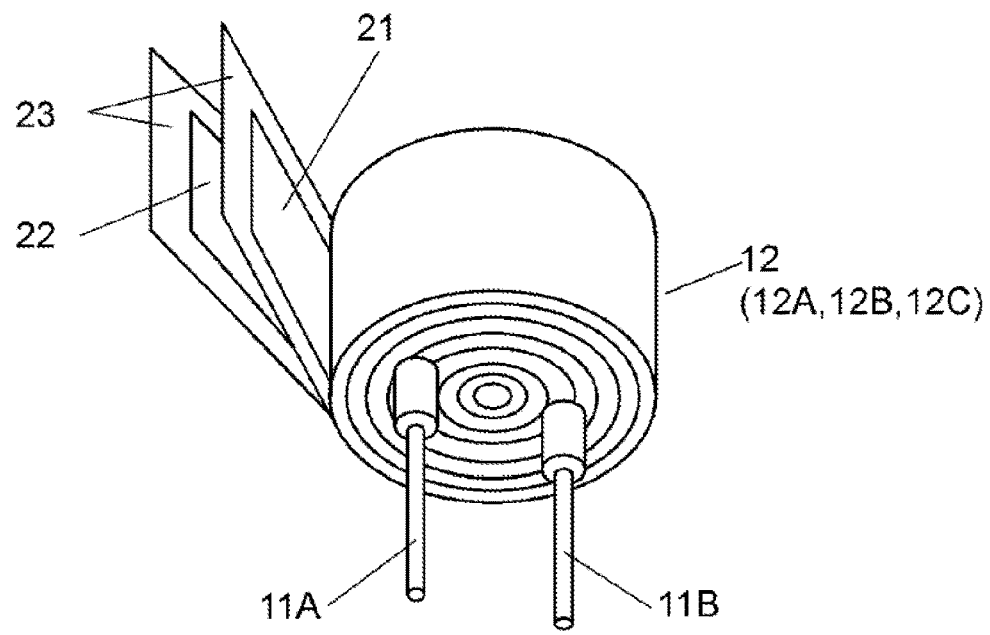
FIG. 2A is a perspective view of an electrical storage element of the electrical storage device shown in FIG. 1.
Figure 2B:
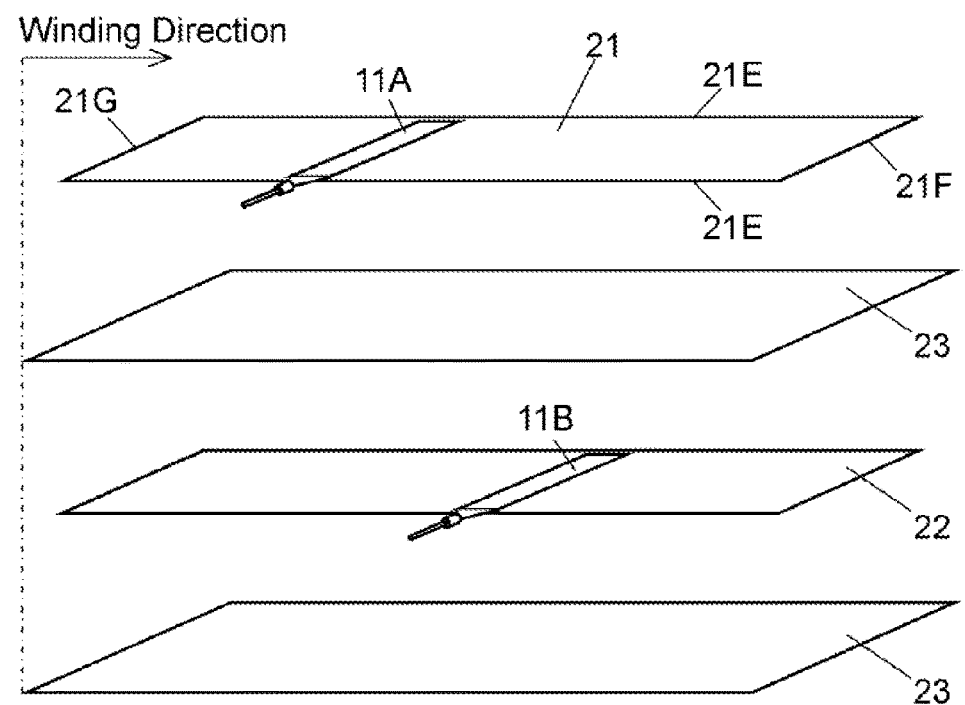
FIG. 2B is a diagram illustrating the lamination relationship among an anode body, a cathode body, and separators in the electrical storage element shown in FIG. 2A.
Figure 3A:
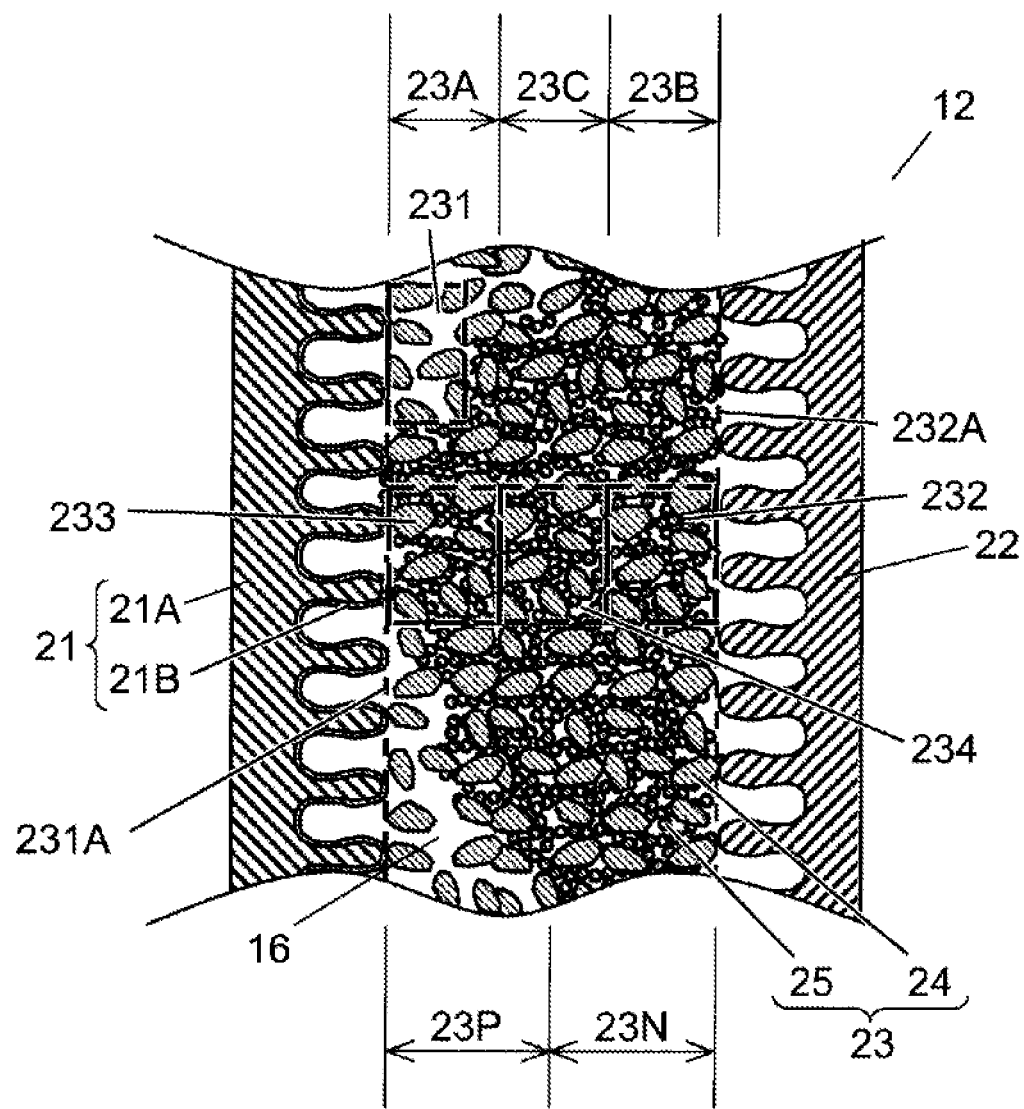
FIG. 3A is a partial sectional schematic diagram of the electrical storage element shown in FIG. 2A.

FIG. 1 is a sectional view of an electrolytic capacitor as one example of an electrical storage device in accordance with a first exemplary embodiment of the present disclosure. FIG. 2A is a perspective view of capacitor element 12 as an electrical storage element of the electrical storage device shown in FIG. 1. FIG. 2B is a diagram for illustrating the lamination relationship among anode body 21, cathode body 22, and separators 23 in capacitor element 12. FIG. 3A is a partial sectional schematic diagram for illustrating separator 23 and electrolytic solution 16 that are interposed between anode body 21 and cathode body 22 in capacitor element 12 shown in FIG. 2A.

The electrolytic capacitor includes capacitor element 12, exterior body 15, and electrolytic solution 16. As shown in FIG. 2A, capacitor element 12 includes an anode foil as anode body 21, a cathode foil as cathode body 22, and separators 23 interposed between anode body 21 and cathode body 22. Anode lead 11A is connected to anode body 21, and cathode lead 11B is connected to cathode body 22. In capacitor element 12, as shown in FIG. 2B, anode body 21, separators 23, and cathode body 22 are stacked, and are wound from one end in the stacked state, thereby forming capacitor element 12. Exterior body 15 is formed of closed-end cylindrical case 13 and seal member 14, and seals capacitor element 12 and electrolytic solution 16 therein.

Capacitor element 12, anode lead 11A, and cathode lead 11B are described with reference to FIG. 2A to FIG. 3C.

Anode body 21 is formed by chemical conversion treatment of the surface that is roughened by etching metal foil 21A made of a valve metal such as aluminum. In other words, anode body 21 includes dielectric oxide film 21B on its surface. Meanwhile, cathode body 22 is made of a metal such as aluminum. In cathode body 22, a chemical conversion film or a film made of a dissimilar metal or nonmetal may be disposed on a surface of the metal such as aluminum. As the dissimilar metal or nonmetal, a metal such as titanium or a nonmetal such as carbon can be employed, for example.

Preferably, at least joined parts of anode lead 11A and cathode lead 11B to anode body 21 and cathode body 22 are made of the same materials as those of anode body 21 and cathode body 22, respectively.

As shown in FIG. 2B, anode lead 11A and cathode lead 11B each having a flattened end are bonded to belt-like anode body 21 and cathode body 22 by ultrasonic welding or needle caulking. The other ends of anode lead 11A and cathode lead 11B are pulled from the same end surface of capacitor element 12.

Separator 23 includes separator substrate 24 and conductive polymer 25 adhering to separator substrate 24. In other words, separator 23 is a kind of conductive separator. FIG. 3A shows the cross section of fibrous separator substrate 24. Separator substrate 24 can be made of paper or nonwoven fabric including nonconductive fibers. The nonconductive fiber is, for example, made of cellulose, polyethylene terephthalate, polybutylene terephthalate, polyphenylene sulfide, nylon, aromatic polyamide, polyimide, polyamide-imide, polyetherimide, rayon, or hyaline (glass). Alternatively, woven fabric may be used as separator substrate 24. FIG. 3A shows separator substrate 24 having uniform density.

Examples of conductive polymer 25 include polypyrrole, polythiophene, polyfuran, polyaniline, polyacetylene, polyphenylene, polyphenylene vinylene, polyacene, and polythiophene vinylene. These compounds may be independently used, a combination of two or more of the compounds may be used, or a copolymer of two or more monomers may be used. In the present description, polypyrrole, polythiophene, polyfuran, polyaniline refer to polymers including, as basic frameworks, polypyrrole, polythiophene, polyfuran, polyaniline, respectively. Therefore, polypyrrole, polythiophene, polyfuran, polyaniline can include their derivatives. For example, polythiophene includes poly(3,4-ethylene dioxythiophene) or the like.

Conductive polymer 25 may include a dopant. Examples of the dopant include anions such as polyvinyl sulfonic acid, polystyrene sulfonic acid, polyallyl sulfonic acid, polyacrylic sulfonic acid, polymethacrylic sulfonic acid, poly(2-acrylamido-2-methyl propane sulfonic acid), polyisoprene sulfonic acid, and polyacrylic acid. Especially, a polyanion derived from polystyrene sulfonic acid is preferable. These compounds may be independently used, and a combination of two or more of the compounds may be used. A polymer of a single monomer may be used, or a copolymer of two or more monomers may be used.

Figure 3B:
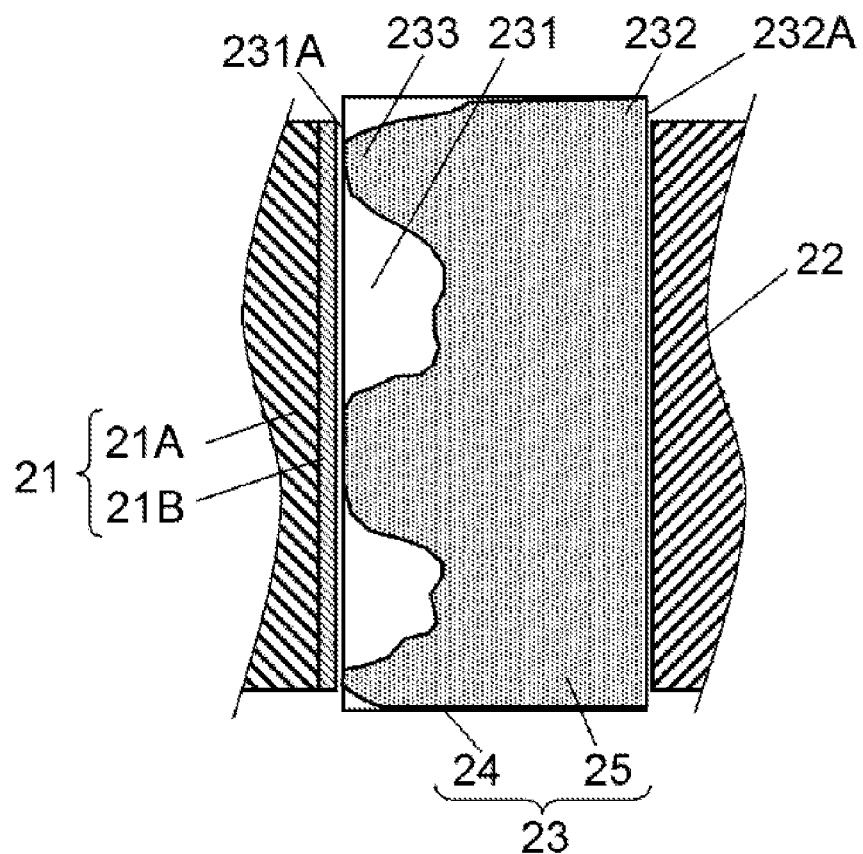
FIG. 3B is a schematic diagram showing the region provided with a conductive polymer in the electrical storage element shown in FIG. 2A.
Figure 3C:
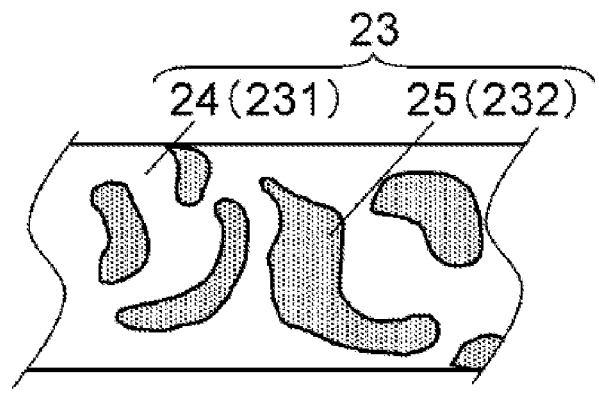
FIG. 3C is a diagram of the separator before winding in the view from the anode body side in the electrical storage element shown in FIG. 2A.

Conductive polymer 25 serves as a cathode of the electrolytic capacitor. Conductive polymer 25 is made to adhere to separator substrate 24 by impregnating separator substrate 24 with a liquid agent and then drying it. The liquid agent includes, for example, a dispersion liquid produced by dispersing fine particles made of poly(3,4-ethylene dioxythiophene) or the like in a dispersion medium, or a solution produced by dissolving polyaniline or the like in a solvent. Conductive polymer 25 is formed in the form of interconnecting particles or a film, and adheres to fibers constituting separator substrate 24. Separator 23 is made of a porous material having voids inside, and electrolytic solution 16 is in the voids. FIG. 3A to FIG. 3C show a state where conductive polymer 25 in a fine-particle form adheres to separator substrate 24.

In making conductive polymer 25 adhere to separator substrate 24 using the dispersion liquid, it is preferable that the diameter of the fine particles of conductive polymer 25 is 1 µm or less. When the diameter of the fine particles of conductive polymer 25 is more than 1 µm, the fine particles are hardly filled into the voids in separator substrate 24, and hence it is difficult to reduce the ESR of the electrolytic capacitor.

As the dispersion medium, a solvent of a low viscosity such as water or lower alcohol is preferable. When a solvent of a low viscosity is used as the dispersion medium, the effect of filling conductive polymer 25 into separator substrate 24 is increased. Furthermore, when a solvent of a high volatility is used as the dispersion medium, the solvent is more easily removed after capacitor element 12 is impregnated with the liquid agent of the fine particles. Therefore, the liquid agent can be easily dried.

By adding a surface-active agent to the dispersion liquid, the filling property of conductive polymer 25 into separator substrate 24 can be further increased. As the surface-active agent to be added, an anionic surface-active agent, a cationic surface-active agent, or a nonionic surface-active agent is used.

When cellulose is used as separator substrate 24, it is preferable that the density of separator substrate 24 is in a range from 0.25 g/cm$^3$ to 0.95 g/cm$^3$, inclusive.

Capacitor element 12 may be formed by stacking anode body 21 and cathode body 22 via separator 23, as described later.

Next, electrolytic solution 16 is described. Electrolytic solution 16 serves as the cathode of the electrolytic capacitor. Electrolytic solution 16 intrudes into the voids in separator 23 or into the holes formed as etching pits of anode body 21. When only separator 23 is disposed between anode body 21 and cathode body 22, conductive polymer 25 adhering to separator substrate 24 hardly comes into contact with dielectric oxide film 21B. Therefore, electrolytic solution 16 must be disposed between the anode body 21 and cathode body 22. Separator substrate 24 swells due to electrolytic solution 16, so that the adhesiveness of anode body 21 and cathode body 22 to separator 23 can be increased.

Electrolytic solution 16 is prepared by dissolving a solute in a solvent. As the solvent, alcohols, an amide solvent, lactones, or sulfoxides as an aprotic organic solvent can be used. Examples of the alcohols include methanol, ethanol, propanol, butanol, cyclobutanol, cyclohexanol, ethylene glycol, propylene glycol, glycerin, methyl cellosolve, ethyl cellosolve, methoxy propylene glycol, and a polycondensate of glycols. Examples of the amide solvent include N-methyl formamide, N,N-dimethyl formamide, N-ethyl formamide, N,N-diethyl formamide, N-methyl acetamide, and N, N-dimethyl acetamide. Examples of the lactones include γ-butyrolactone, β-butyrolactone, α-valerolactone, and γ-valerolactone. Examples of the sulfoxides include sulfolane, 3-methyl sulfolane, and dimethyl sulfoxide. In the electrolytic capacitor for intermediate/high voltage, preferably, ethylene glycol is used as the solvent.

As the base component of an electrolyte component as the solute, a compound including an alkyl-substituted amidine group, an imidazole compound, a benzimidazole compound, or an alicyclic amidine compound (pyrimidine compound or imidazoline compound) is used. As the base component of an electrolyte component, a quaternary ammonium of a compound including an alkyl-substituted amidine group can be also used. Examples of the quaternary ammonium of the compound including the alkyl-substituted amidine group include an imidazole compound, benzimidazole compound, and alicyclic amidine compound (pyrimidine compound or imidazoline compound) that are quaternized with an alkyl group or aryl alkyl group having 1 to 11 carbon atoms. As the base component, the following compound may be used: ammonium; primary amine (methylamine, ethylamine, propylamine, butyl amine ethylenediamine, or monoethanolamine); secondary amine (dimethylamine, diethylamine, dipropylamine, ethyl methyl amine, diphenylamine, or diethanolamine); or tertiary amine (trimethylamine, triethylamine, tributylamine, 1,8-diazabicyclo(5,4,0)-undecene-7, or triethanolamine). Preferably, as the base component of an electrolyte component as the solute in the electrolytic capacitor for intermediate/high voltage, ammonium, diethylamine, or triethylamine is used.

As the acid component of the electrolyte component, saturated carboxylic acid and unsaturated carboxylic acid, which are aliphatic carboxylic acids, or aromatic carboxylic acid can be used. Examples of the aliphatic saturated carboxylic acid include oxalic acid, malonic acid, succinic acid, glutaric acid, adipic acid, pimelic acid, suberic acid, azelaic acid, sebacic acid, 1,6-decanedicarboxylic acid, 5,6-decanedicarboxylic acid, formic acid, acetic acid, propionic acid, butyric acid, isobutyric acid, valeric acid, caproic acid, enanthic acid, caprylic acid, pelargonic acid, lauric acid, myristic acid, stearic acid, and behenic acid. Examples of the aliphatic unsaturated carboxylic acid include maleic acid, fumaric acid, itaconic acid, acrylic acid, methacrylic acid, and oleic acid. Examples of the aromatic carboxylic acid include phthalic acid, salicylic acid, isophthalic acid, terephthalic acid, trimellitic acid, pyromellitic acid, benzoic acid, resorcinol acid, cinnamic acid, and naphthoic acid. Instead of these carboxylic acids, a nitro derivative or sulfonic acid derivative of carboxylic acid, or a phosphoric-acid derivative or boric-acid derivative as inorganic acid can be used as the acid component of the electrolyte. In the electrolyte component, preferably, the content—in a molar ratio—of the acid component is higher than that of the base component. In this case, the acidity of electrolytic solution 16 is increased, and the de-doping reaction of separator 23 can be effectively suppressed. As the acid component of an electrolyte component as the solute in the electrolytic capacitor for intermediate/high voltage, preferably, the following compound is used: organic acid such as decanedicarboxylic acid (for example, 1,6-decanedicarboxylic acid or 5,6-decanedicarboxylic acid), octane dicarboxylic acid (for example, 1,7-octane dicarboxylic acid), azelaic acid, or sebacic acid; or boric acid, or a polyhydric alcohol complex compound of boric acid.

Next, exterior body 15 is described. Exterior body 15 seals capacitor element 12 so that the end of each of anode lead 11A and cathode lead 11B pulled out of capacitor element 12 is guided to the outside.

Exterior body 15 includes case 13 and seal member 14. Case 13 accommodates capacitor element 12 and electrolytic solution 16. Seal member 14 is provided with through holes 14A and 14B through which anode lead 11A and cathode lead 11B pass, respectively. Seal member 14 is disposed in an opening of case 13, and is compressed by narrowing the outer peripheral surface of case 13 at a narrowing portion 13A. Thus, the opening of case 13 is sealed.

Capacitor element 12 may be accommodated in case 13 after capacitor element 12 is impregnated with electrolytic solution 16. The procedure is not limited to this. For example, the following methods may be employed: after capacitor element 12 is inserted into case 13, electrolytic solution 16 is filled into case 13, and then case 13 is sealed; and after electrolytic solution 16 is filled into case 13, capacitor element 12 is inserted into case 13, and then case 13 is sealed.

As seal member 14, not only a rubber material such as an ethylene-propylene rubber and an butyl rubber, but also a resin material such as epoxy resin can be employed. The butyl rubber is a copolymer of isobutyl and isoprene.

Case 13 is made of a metal. In order to reduce the weight, preferably, case 13 is made of aluminum.

The structure of separator 23 is described in detail with reference to FIG. 2B, FIG. 3A, FIG. 3B, and FIG. 3C. FIG. 3B is a schematic diagram showing the region provided with conductive polymer 25 in capacitor element 12. In FIG. 3B, the electrolytic solution is not illustrated. FIG. 3C is a diagram of separator 23 before winding in the view from the anode body side.

As shown in FIG. 2B, separator 23 has a paper-like outer shape. As shown in FIG. 3A and FIG. 3B, separator 23 includes first surface layer 23A having first surface 231A facing anode body 21, second surface layer 23B having second surface 232A facing cathode body 22, and intermediate layer 23C disposed between first surface layer 23A and second surface layer 23B. First surface layer 23A includes first region 231 that is not provided with conductive polymer 25, and second surface layer 23B includes second region 232 that is provided with conductive polymer 25. Each of first surface 231A and second surface 232A is a part of a surface defining the outer shape of separator 23 having the paper-like shape. Metal foil 21A of anode body 21 has etching pits as discussed above. Dielectric oxide film 21B is formed along the shapes of the etching pits. Thus, in anode body 21 having the etching pits, a part of the surface defining the foil-like outer shape is in contact with separator 23.

Separator 23 is formed as described below. First, a liquid agent as a solution or dispersion liquid of conductive polymer 25 is applied to only second surface 232A of separator substrate 24, so as to infiltrate into separator substrate 24. Then, the solvent or dispersion medium contained in the liquid agent is volatized.

As the liquid agent infiltrates into second surface layer 23B, intermediate layer 23C, and first surface layer 23A sequentially in this order, the amount of conductive polymer 25 to adhere to separator substrate 24 gradually decreases. As a result, first region 231 is formed in first surface layer 23A, and second region 232 is formed in second surface layer 23B. Thus, in separator 23, the adhering amount of conductive polymer 25 on the cross section parallel to first surface 231A and perpendicular to the thickness direction of separator 23 becomes smaller as the cross section becomes closer to anode body 21.

In other words, the adhering amount of conductive polymer 25 is small in the vicinity of anode body 21 that affects the withstand voltage. As a result, near dielectric oxide film 21B, electrolytic solution 16 that has a higher capability of repairing dielectric oxide film 21B than that of conductive polymer 25 is easily disposed. Thus, the capability of repairing dielectric oxide film 21B is increased, and hence the withstand voltage characteristic of the electrolytic capacitor is improved. In the present exemplary embodiment, furthermore, second region 232 provided with conductive polymer 25 exists in second surface layer 23B. Therefore, the conductivity of separator 23 is increased, and the ESR of the electrolytic capacitor is reduced.

The above-mentioned effect is remarkable when the electrolytic capacitor is used at a high voltage of 100 V or more. In the case where the electrolytic capacitor is used at an intermediate/high voltage of 100 V or more, the effect of repairing the dielectric oxide film is required to be higher than in the case where the electrolytic capacitor is used in a region of a low voltage lower than 100 V. Therefore, this structure is more effective when it is applied to the electrolytic capacitor used at an intermediate/high voltage of 100 V or more.

First surface layer 23A includes third region 233 provided with conductive polymer 25. Even in this case, it is preferable that the area of third region 233 facing anode body 21 in first surface layer 23A is smaller than the area of second region 232 facing cathode body 22 in second surface layer 23B. In order to determine the area of third region 233 facing anode body 21 in first surface layer 23A, first surface layer 23A is observed with an optical microscope or the like and a two-dimensional image is acquired as shown in FIG. 3C. The facing area is acquired by determining the area of the portion having conductive polymer 25 on the two-dimensional image. Also in order to determine the area of second region 232 facing cathode body 22 in second surface layer 23B, second surface layer 23B is observed with an optical microscope or the like and a two-dimensional image is acquired. The facing area is acquired by determining the area of the portion having conductive polymer 25 on the two-dimensional image.

The portion from the center of separator 23 in the thickness direction to first surface 231A is defined as first separator half-body 23P, and the portion from the center of separator 23 in the thickness direction to second surface 232A is defined as second separator half-body 23N. In this definition, in the present exemplary embodiment, the amount of conductive polymer 25 adhering to first separator half-body 23P is smaller than the amount of conductive polymer 25 adhering to second separator half-body 23N.

Thus, by reducing the adhering amount of conductive polymer 25 near anode body 21 or on the side of separator 23 that is closer to anode body 21, electrolytic solution 16 can be efficiently disposed near dielectric oxide film 21B. Therefore, the capability of repairing dielectric oxide film 21B is improved and the withstand voltage characteristic of capacitor element 12 is further improved.

Note that first surface layer 23A may be formed of only first region 231 without having third region 233. In this case, conductive polymer 25 is not exposed on first surface 231A. Such a structure can further improve the withstand voltage characteristic, and is suitable for an electrolytic capacitor of a high withstand voltage.

When first surface layer 23A includes third region 233 provided with conductive polymer 25, and separator 23 includes intermediate layer 23C, it is preferable that intermediate layer 23C includes fourth region 234 provided with conductive polymer 25 and, conductive polymer 25 adhering to third region 233 electrically communicates with conductive polymer 25 adhering to second region 232 via conductive polymer 25 adhering to fourth region 234. The effect of reducing the ESR is produced by interconnecting fine particles or films of conductive polymer 25. Therefore, it is preferable that conductive polymers 25 are interconnected (joined) in separator 23.

Figure 4:
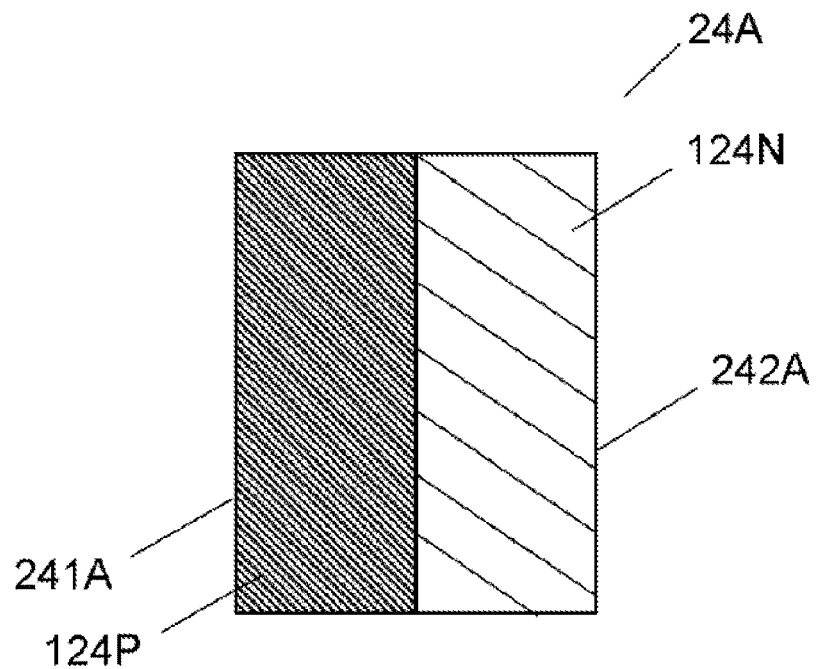
FIG. 4 is a schematic diagram showing another example of the separator substrate shown in FIG. 3B.
Figure 5:
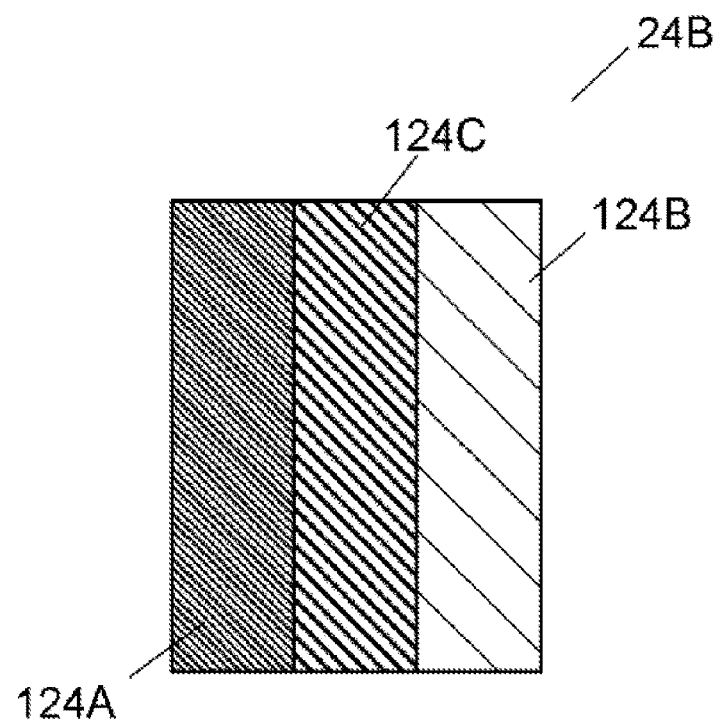
FIG. 5 is a schematic diagram showing yet another example of the separator substrate shown in FIG. 3B.

Next, other aspects of the separator substrate are described with reference to FIG. 4 and FIG. 5. FIG. 4 and FIG. 5 are schematic diagrams showing separator substrates 24A and 24B as other examples of the separator substrate.

Separator substrate 24A shown in FIG. 4 includes first substrate layer 124P and second substrate layer 124N. First substrate layer 124P includes first surface 241A of separator substrate 24A, and is disposed adjacently to anode body 21. Second substrate layer 124N includes second surface 242A of separator substrate 24A, and is disposed adjacently to cathode body 22. First substrate layer 124P includes fibers at a higher density than second substrate layer 124N. In other words, the airtightness of first substrate layer 124P is higher than that of second substrate layer 124N. Here, first surface 241A and second surface 242A are surfaces defining the outer shape of separator substrate 24A.

By forming the conductive separator using such separator substrate 24A, when a liquid agent as a solution or dispersion liquid of conductive polymer 25 is applied to second surface 242A of separator substrate 24A, the liquid agent hardly arrives at first surface 241A of first substrate layer 124P. Therefore, in first substrate layer 124P constituting the first surface layer, a first region that is not provided with conductive polymer 25 is certainly formed. This structure is effective when the amount of conductive polymer 25 adhering to separator substrate 24A is intended to be increased on the cathode side of the separator. Specifically, preferably, the density of nonconductive fiber in first substrate layer 124P is higher than that in second substrate layer 124N by 0.1 g/cm$^3$ or more.

When the fiber density in first substrate layer 124P of separator substrate 24A is made higher than that in second substrate layer 124N, the content of electrolytic solution 16 is small and the capability of repairing dielectric oxide film 21B is low near anode body 21 or on the side close to anode body 21 in separator 23. When the fiber density in first substrate layer 124P of separator substrate 24A is higher than that in second substrate layer 124N, however, the adhering amount of conductive polymer 25 to the first surface layer of separator 23 becomes smaller than the adhering amount of conductive polymer 25 to the second surface layer. Therefore, the amount of conductive polymer 25 in the vicinity of anode body 21 that directly affects the withstand voltage of the electrolytic capacitor becomes small, and the withstand voltage characteristic of the electrolytic capacitor is improved.

The effect of improving the withstand voltage characteristic is produced in the first surface layer of separator 23 regardless of the presence or absence of the first region that is not provided with conductive polymer 25. When the first surface layer includes the first region, however, the effect of improving the withstand voltage characteristic further increases.

In the case that separator 23 is formed using separator substrate 24A in which the fiber density on the anode body 21 side is higher than the fiber density on the cathode body 22 side, a capacitor element is formed in the following steps as discussed above: applying a liquid agent as a solution or dispersion liquid of conductive polymer 25 to second surface 242A of separator substrate 24A; volatilizing the solvent or dispersion medium contained in the applied liquid agent; forming separator 23 in which separator substrate 24 is provided with conductive polymer 25; and then winding anode body 21 and cathode body 22 via separator 23 therebetween. Thus, a capacitor element including separator 23 provided with conductive polymer 25 is formed. Instead of this method, the following method may be employed, for example.

The method is described in detail. First, an element forming process is performed. In this process, anode body 21 is confronted with first surface 241A of first substrate layer 124P having a higher fiber density in separator substrate 24, and one surface of cathode body 22 is confronted with second surface 242A of second substrate layer 124N having a lower fiber density in separator substrate 24. Furthermore, the other surface of cathode body 22 is confronted with second surface 242A of second substrate layer 124N of another separator substrate 24, which has the same specification as that of separator substrate 24 facing the one surface of cathode body 22. Anode body 21, separator substrate 24, cathode body 22, and another separator substrate 24 are wound in the overlapping state, thereby forming an element that is to contain conductive polymer 25.

Next, a liquid agent impregnation process is performed. In this process, the element formed in the element forming process is impregnated with a liquid agent as a solution or dispersion liquid of conductive polymer 25, the solvent or dispersion medium contained in the impregnated liquid-agent is volatilized, separator 23 in which a substantially whole of separator substrate 24 is provided with conductive polymer 25 is formed, and capacitor element 12 is formed. Since the fiber density in first substrate layer 124P of separator substrate 24 is higher than that in second substrate layer 124N, this process allows the amount of the conductive polymer adhering to the first surface layer of separator 23 to be smaller than the amount of the conductive polymer adhering to the second surface layer.

Alternatively, separator substrate 24B shown in FIG. 5 may be employed. Separator substrate 24B includes intermediate substrate layer 124C between first substrate layer 124A and second substrate layer 124B. First substrate layer 124A includes fiber at a higher density than second substrate layer 124B. Also in this case, similarly to separator substrate 24A, the first surface layer includes nonconductive fibers at a higher density than the second surface layer, and first region that is not provided with conductive polymer 25 is formed in first substrate layer 124A constituting the first surface layer. The fiber density in intermediate substrate layer 124C may be higher or lower than that in second substrate layer 124B. When the fiber density in intermediate substrate layer 124C is higher than that in second substrate layer 124B, the adhering amount of conductive polymer 25 in first substrate layer 124A can be reduced, and the withstand voltage characteristic further is improved. When the fiber density in intermediate substrate layer 124C is lower, the liquid agent is apt to infiltrate into intermediate substrate layer 124C through second substrate layer 124B, the adhering amount of conductive polymer 25 in intermediate substrate layer 124C increases, and conductive polymer 25 distributes widely in the thickness direction of the separator. Therefore, the ESR is reduced. Thus, the fiber density in intermediate substrate layer 124C is adjusted so as to obtain a required characteristic.

In order to change the fiber density in the thickness direction as shown in separator substrates 24A and 24B, the dispersion concentration of fiber is changed during making the paper; or a separator substrate is formed by pasting a plurality of separator sheets of different fiber densities on each other.

Second Exemplary Embodiment

Figure 6:
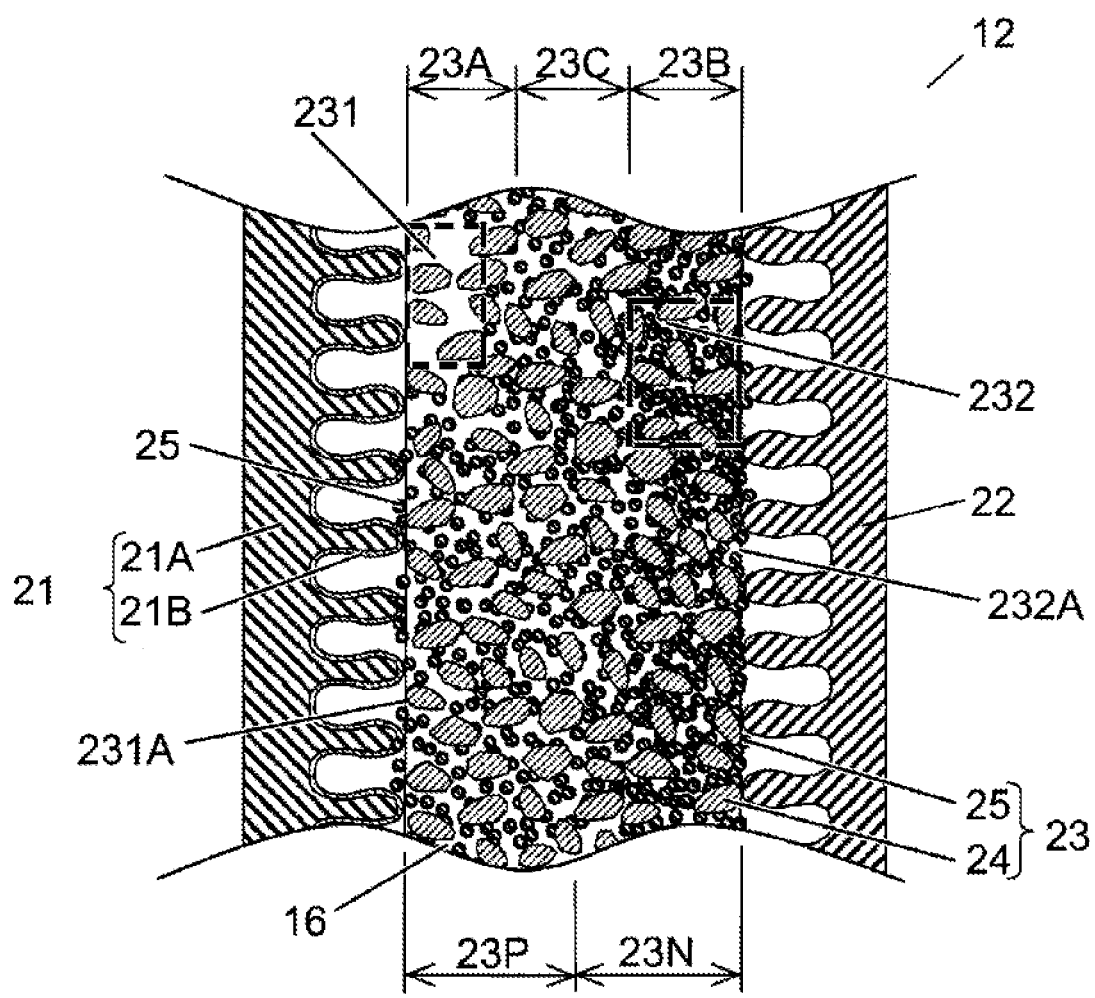
FIG. 6 is a partial sectional schematic diagram of an electrical storage element in accordance with the second exemplary embodiment of the present disclosure.

FIG. 6 is a partial sectional schematic diagram for illustrating separator 23 and electrolytic solution 16 that are interposed between anode body 21 and cathode body 22 in capacitor element 12 as an example of an electrical storage element in accordance with a second exemplary embodiment of the present disclosure. The fundamental structures of an electrolytic capacitor as the electrical storage device and capacitor element 12 of the present exemplary embodiment are the same as those in the first exemplary embodiment described with reference to FIG. 1, FIG. 2A, and FIG. 2B. Therefore, the descriptions of those components are omitted. The same components are denoted with the same reference marks, and detailed descriptions of those elements may be omitted.

As shown in FIG. 2B and FIG. 6, separator 23 includes separator substrate 24 having first surface 231A facing anode body 21, and second surface 232A facing cathode body 22, and conductive polymer 25 adhering to first surface 231A and its vicinity and adhering to second surface 232A and its vicinity in separator substrate 24. First surface layer 23A includes first region 231 that is not provided with conductive polymer 25, and second surface layer 23B includes second region 232 that is provided with conductive polymer 25.

First surface 231A and second surface 232A are some of the surfaces defining the outer shape of separator 23. Metal foil 21A of anode body 21 has etching pits as discussed above. Dielectric oxide film 21B is formed along the shapes of the etching pits. Thus, in anode body 21 having etching pits, a part of the surface defining anode body 21 is in contact with separator 23.

The adhering amount—per unit area of separator substrate 24—of conductive polymer 25 to first surface 231A of separator substrate 24 is smaller than the adhering amount—per unit area of separator substrate 24—of conductive polymer 25 to second surface 232A of separator substrate 24.

The forming method of separator 23 of the second exemplary embodiment is described.

A liquid agent as a solution or dispersion liquid of conductive polymer 25 is applied to second surface 232A as one surface of separator substrate 24 so as to infiltrate into separator substrate 24 through second surface 232A of separator substrate 24. Then, the solvent or dispersion medium contained in the liquid agent is volatilized.

After volatilization of the solvent or dispersion medium contained in the liquid agent applied to separator substrate 24, conductive polymer 25 adheres to separator substrate 24.

In order to achieve the following condition of the adhering amount, the amount of the liquid agent applied to second surface 232A of separator substrate 24, the concentration of the conductive polymer, the applying frequency, and the density of separator substrate 24 are controlled, for example. Here, the condition is that the adhering amount—per unit area of separator substrate 24—of conductive polymer 25 to first surface 231A of separator substrate 24 is smaller than the adhering amount—per unit area of separator substrate 24—of conductive polymer 25 to second surface 232A of separator substrate 24.

As a method of making conductive polymer 25 adhere to separator substrate 24, a method of applying the liquid agent to both of first surface 231A and second surface 232A of separator substrate 24 can be employed. In this case, the amount and concentration of the liquid agent applied to first surface 231A and second surface 232A of separator substrate 24 are controlled.

Thus, by making conductive polymer 25 adhere to separator substrate 24, conductivity is added to separator 23 and the ESR of the electrolytic capacitor can be reduced. Then, by setting the adhering amount—per unit area of separator substrate 24—of conductive polymer 25 to first surface 231A of separator substrate 24 to be smaller than the adhering amount—per unit area of separator substrate 24—of conductive polymer 25 to second surface 232A of separator substrate 24, the amount of conductive polymer 25 existing near anode body 21 of the electrolytic capacitor or the amount of conductive polymer 25 being in contact with anode body 21 is decreased. Therefore, the withstand voltage of the electrolytic capacitor is improved.

The adhering amount—per unit area of separator substrate 24—of conductive polymer 25 to first surface 231A or second surface 232A of separator substrate 24 is determined by analyzing the distribution state of a specific element existing on the surface of separator substrate 24 by an energy dispersive X-ray analyzer (EDAX). Here, the specific element depends on the elements constituting a used conductive polymer.

Third Exemplary Embodiment

Figure 7A:
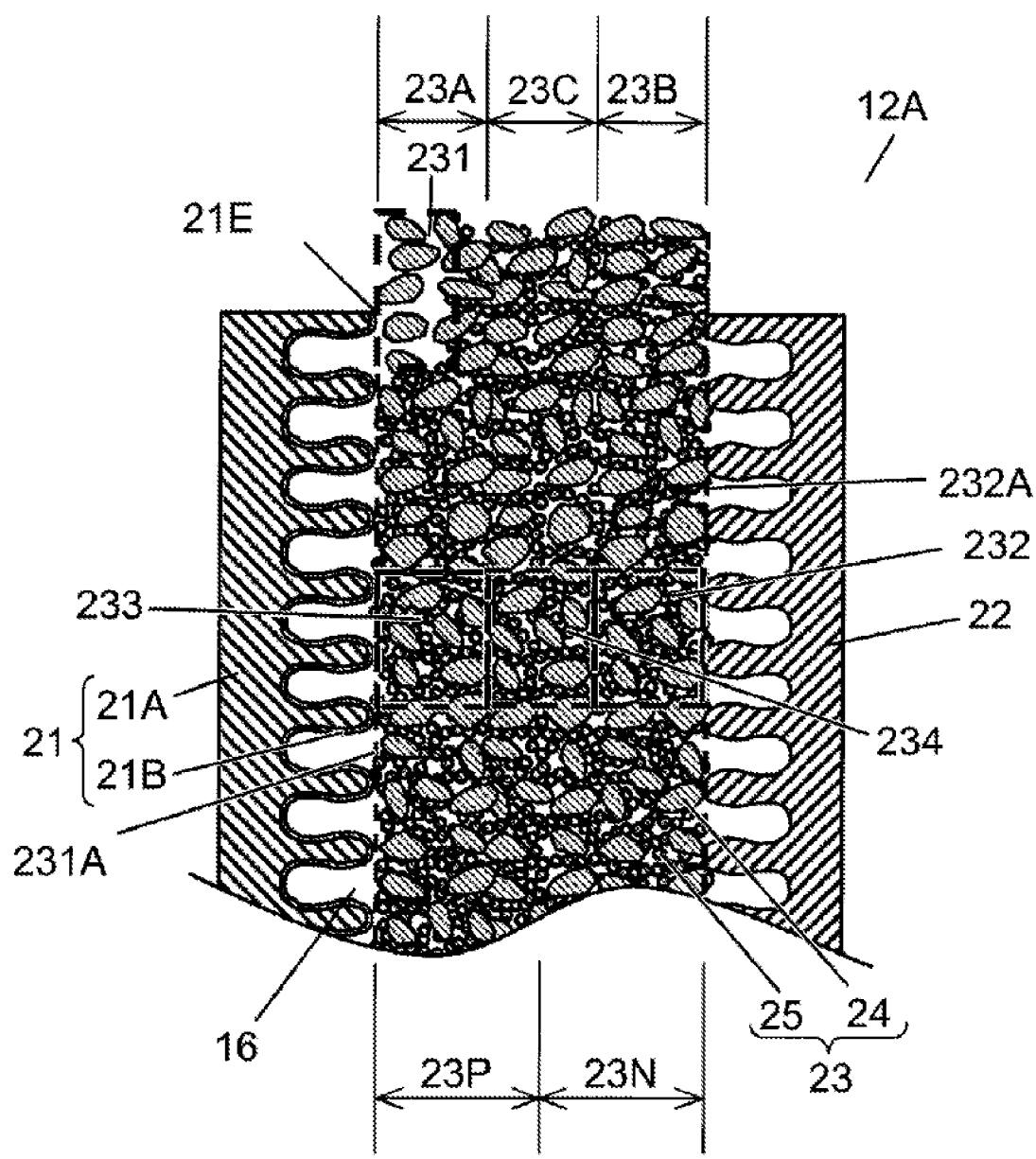
FIG. 7A is a partial sectional schematic diagram of an electrical storage element in accordance with the third exemplary embodiment of the present disclosure.
Figure 7B:
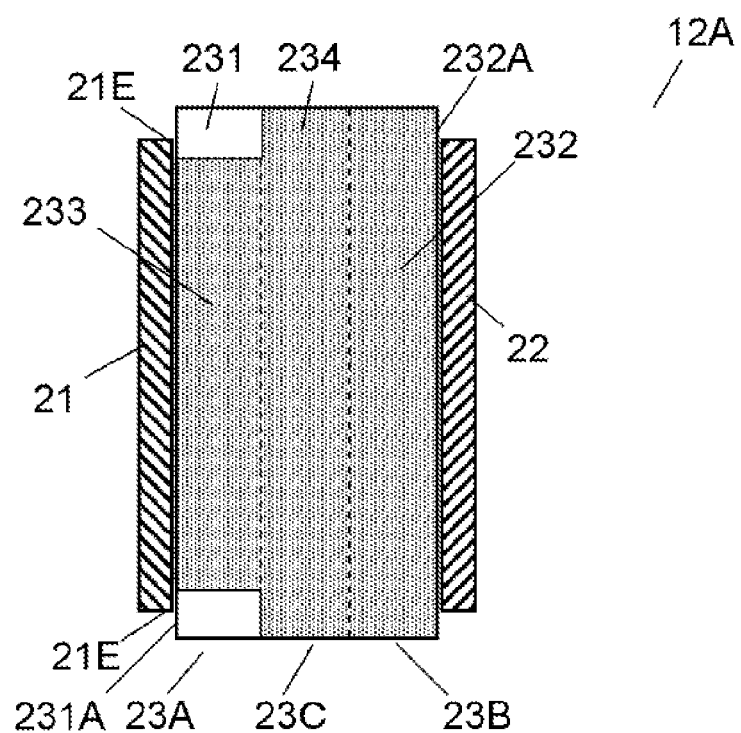
FIG. 7B is a schematic diagram showing a region provided with a conductive polymer in the electrical storage element shown in FIG. 7A.

FIG. 7A is a partial sectional schematic diagram for illustrating separator 23 and electrolytic solution 16 that are interposed between anode body 21 and cathode body 22 in capacitor element 12A as an example of an electrical storage element in accordance with a third exemplary embodiment of the present disclosure. FIG. 7B is a schematic diagram showing the region provided with conductive polymer 25 in electrical storage element 12A. The fundamental structures of an electrolytic capacitor as the electrical storage devices of the present exemplary embodiment and capacitor element 12A are the same as those in the first exemplary embodiment described with reference to FIG. 1, FIG. 2A, and FIG. 2B. Therefore, the descriptions of those components are omitted. The same components are denoted with the same reference marks, and detailed descriptions of those elements may be omitted.

In capacitor element 12A, first region 231 that is not provided with conductive polymer 25 is disposed at the position facing each edge 21E of anode body 21, in first surface layer 23A of separator 23.

FIG. 7A and FIG. 7B schematically show the portion of separator 23 that is sandwiched between anode body 21 and cathode body 22 on the longitudinal cross section of capacitor element 12A shown in FIG. 1. First region 231 is disposed at the position facing each edge 21E of anode body 21 that is along the winding direction shown in FIG. 2B.

Metal foil 21A constituting anode body 21 includes dielectric oxide film 21B on its surface. Anode body 21 is formed by cutting belt-like wide metal foil 21A, which includes dielectric oxide film 21B on its surface, into a size appropriate for the capacity of the electrolytic capacitor. Therefore, dielectric oxide film 21B is not formed on the cut end of anode body 21 after the cutting, and metal foil 21A is exposed. Therefore, dielectric oxide film 21B is formed on metal foil 21A exposed on the cut end, by separately performing a process of forming dielectric oxide film 21B on the cut end, or by forming dielectric oxide film 21B on the cut end by the repairing effect by electrolytic solution 16. However, dielectric oxide film 21B formed on the cut end in such a method has a low film quality, is apt to undergo a defect such as a crack, and affects the withstand voltage characteristic of the electrolytic capacitor.

In separator 23 of the present exemplary embodiment, first region 231 is disposed at the position facing each edge 21E corresponding to each cut end of metal foil 21A. Thus, separator 23 includes first region 231 at the position facing each edge 21E at which a defect is apt to occur in dielectric oxide film 21B, so that the withstand voltage characteristic of the electrolytic capacitor is improved. In order to reduce the ESR, however, it is preferable that the range as large as possible of separator substrate 24 is provided with conductive polymer 25. Therefore, preferably, third region 233 provided with conductive polymer 25 is disposed in first surface layer 23A.

Thus, in order to form first region 231 at the position facing each edge 21E and form third region 233 in a portion other than the position in first surface layer 23A in separator 23, a liquid agent as a solution or dispersion liquid of conductive polymer 25 is applied to both of the first surface of separator substrate 24 that faces anode body 21 and the second surface thereof that faces cathode body 22. Then, the liquid agent is made to infiltrate into separator substrate 24, and then, the solvent or dispersion medium contained in the liquid agent is volatized. At this time, by applying the liquid agent by a printing method such as an ink-jet method, first region 231 can be formed at a predetermined position in first surface layer 23A. By applying the liquid agent also to the second surface of separator substrate 24, large second region 232 can be formed in second surface layer 23B. In other words, in forming separator 23, a non-application portion to which the liquid agent is not applied is left on the first surface of separator substrate 24, and an application portion to which the liquid agent is applied is disposed on the second surface of separator substrate 24. Then, by applying the liquid agent to the first surface of separator substrate 24 by printing, the region to which the liquid agent is applied can be controlled and the non-application portion can be formed easily.

As the printing method, for example, an appropriate method such as an ink-jet method, a gravure coater method, or a screen printing method can be employed. Especially, the ink-jet method is more preferable because the region to which the liquid agent is applied and the application amount of the liquid agent can be easily controlled.

Thus, also in the present exemplary embodiment, first surface layer 23A includes first region 231 that is not provided with conductive polymer 25, and second surface layer 23B includes second region 232 that is provided with conductive polymer 25.

In addition, first surface layer 23A includes third region 233 that is provided with conductive polymer 25. The facing area of third region 233 confronting anode body 21 in first surface layer 23A is smaller than the facing area of second region 232 confronting cathode body 22 in second surface layer 23B. This is because first region 231 is formed at the position facing each edge 21E in separator 23. The abovementioned structure can be formed by making the area of the application region of the liquid agent on first surface 231A smaller than the area of the application region of the liquid agent on second surface 232A.

Furthermore, intermediate layer 23C includes fourth region 234 provided with conductive polymer 25. Conductive polymer 25 adhering to third region 233 electrically communicates with conductive polymer 25 adhering to second region 232 via conductive polymer 25 adhering to fourth region 234. This effect is similar to that in the first exemplary embodiment.

Figure 8:
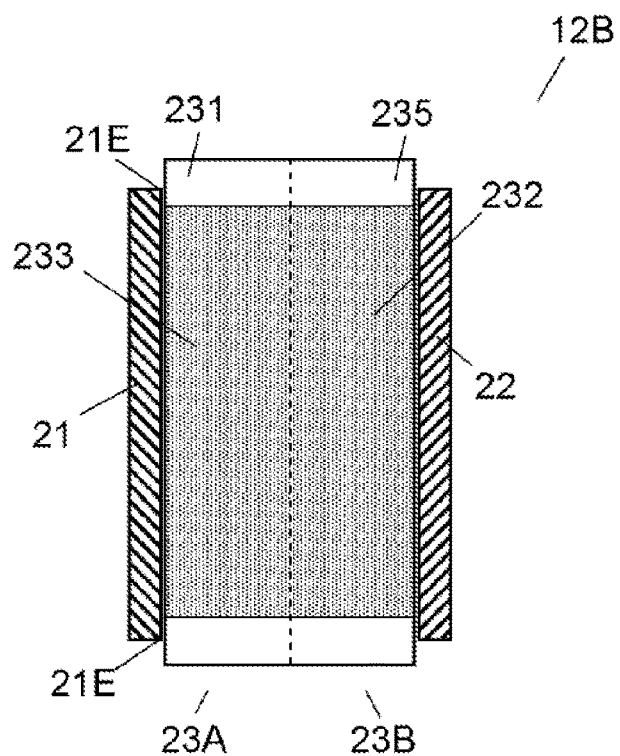
FIG. 8 is a schematic diagram showing a region provided with the conductive polymer in another electrical storage element in accordance with the third exemplary embodiment of the present disclosure.
Figure 9:
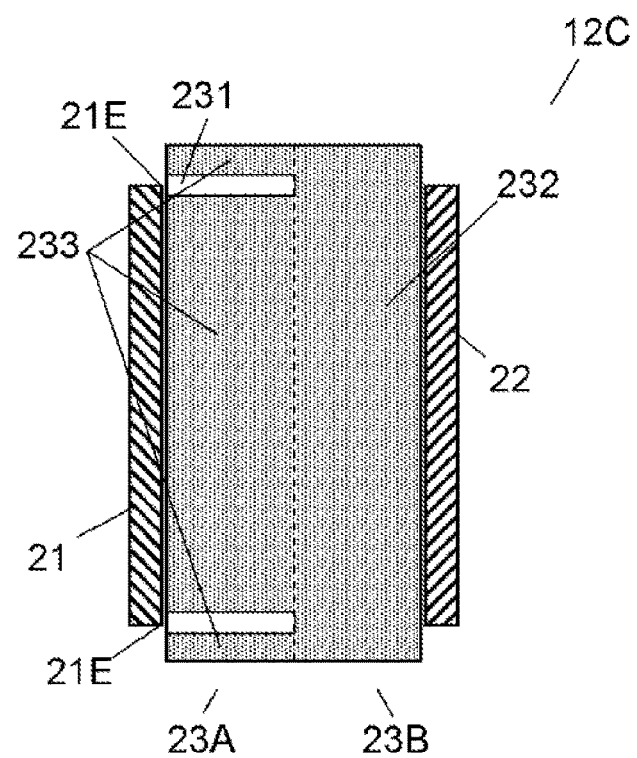
FIG. 9 is a schematic diagram showing a region provided with the conductive polymer in yet another electrical storage element in accordance with the third exemplary embodiment of the present disclosure.

Next, other structures according to the present exemplary embodiment are described with reference to FIG. 8 and FIG. 9. FIG. 8 and FIG. 9 are schematic diagrams showing the regions provided with conductive polymer 25 in other capacitor elements 12B and 12C in accordance with the third exemplary embodiment of the present disclosure.

In capacitor element 12B shown in FIG. 8, similarly to the structure shown in FIG. 7B, first region 231 is disposed in separator 23 at the position facing each edge 21E. Fifth region 235 that is not provided with conductive polymer 25 is disposed at the position in second surface layer 23B that corresponds to each first region 231. Thus, in order to form fifth region 235 at the position facing each edge 21E in second surface layer 23B, the liquid agent containing conductive polymer 25 is not applied to the position corresponding to fifth region 235. In this structure, the phenomenon in which the liquid agent infiltrates into the position facing each edge 21E in first surface layer 23A is further suppressed. Therefore, first region 231 can be formed at each edge 21E in first surface layer 23A, and the withstand voltage characteristic is improved.

Meanwhile, in capacitor element 12C shown in FIG. 9, first region 231 is disposed at the position facing each edge 21E in separator 23, but the outside of the position in separator substrate 24 is also provided with conductive polymer 25. In other words, third region 233 is so formed as to sandwich first region 231. When separator 23 is wider than anode body 21, the ESR of the electrolytic capacitor can be further reduced by making the portion of separator 23 that projects from each end of anode body 21 also conductive. This structure can be also formed by applying a liquid agent containing conductive polymer 25 to first surface 231A by printing.

Figure 10:
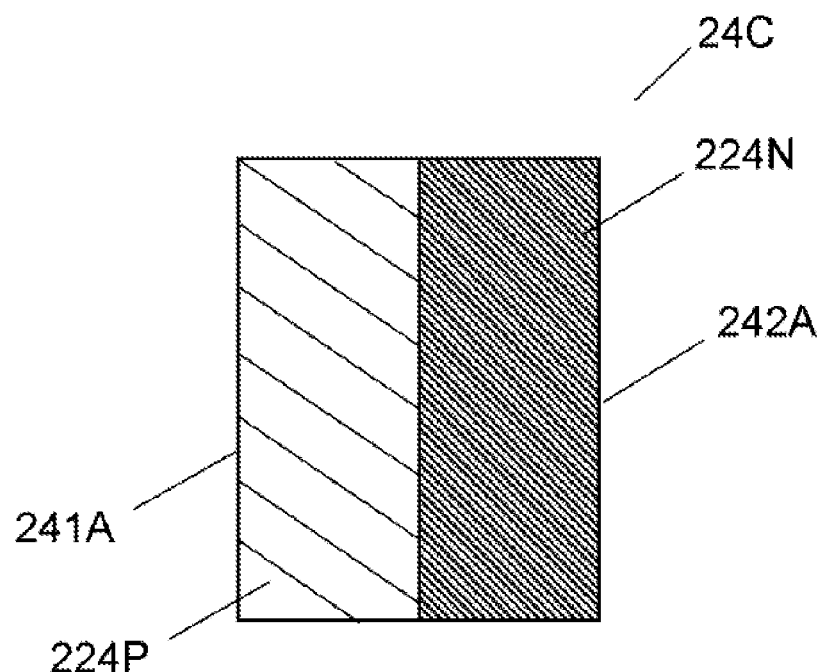
FIG. 10 is a schematic diagram showing another example of the separator substrate shown in FIG. 7A.
Figure 11:
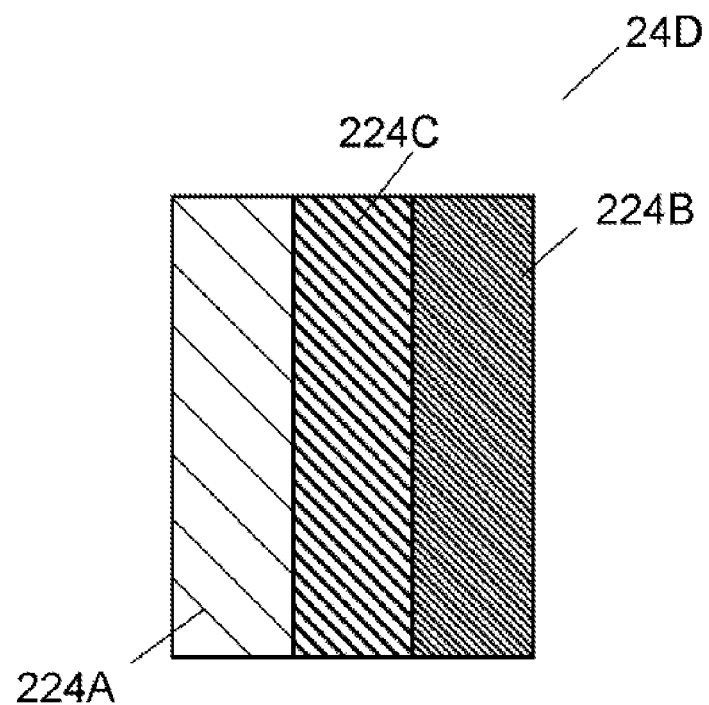
FIG. 11 is a schematic diagram showing yet another example of the separator substrate shown in FIG. 7A.

FIG. 8 and FIG. 9 do not show intermediate layer 23C. Such a structure may be employed where intermediate layer 23C does not exist and first surface layer 23A is directly connected to second surface layer 23B. When intermediate layer 23C is disposed as shown in FIG. 7B, the width (namely, thickness) of the layer is not particularly limited. In order to further reduce the ESR, it is preferable that the amount of conductive polymer 25 existing in first surface layer 23A is large. One example of the structure for creating such a state is described with reference to FIG. 10 and FIG. 11. FIG. 10 and FIG. 11 are schematic diagrams showing the other examples of the separator substrate shown in FIG. 7A.

Separator substrate 24C shown in FIG. 10 includes first substrate layer 224P and second substrate layer 224N. First substrate layer 224P includes first surface 241A of separator substrate 24C, and is disposed adjacently to anode body 21. Second substrate layer 224N includes second surface 242A of separator substrate 24C, and is disposed adjacently to cathode body 22. Second substrate layer 224N includes nonconductive fiber at a higher density than first substrate layer 224P. In other words, the airtightness of first substrate layer 224P is lower than that of second substrate layer 224N.

Thus, a larger number of voids into which a liquid agent containing conductive polymer 25 infiltrates are included in first substrate layer 224P than in second substrate layer 224N. Therefore, a larger amount of conductive polymer 25 can be included in first substrate layer 224P constituting the first surface layer than in second substrate layer 224N constituting the second surface layer. As a result, the ESR can be reduced while the withstand voltage is kept by the first region that is not provided with conductive polymer 25. In this case, the amount of the liquid agent applied to first surface 241A is set larger than the amount of the liquid agent applied to second surface 242A. Specifically, it is preferable that the density of nonconductive fiber in second substrate layer 224N is higher than that in first substrate layer 224P by 0.1 g/cm$^3$ or more.

Alternatively, separator substrate 24D shown in FIG. 11 may be employed. Separator substrate 24D includes intermediate substrate layer 224C between first substrate layer 224A and second substrate layer 224B. Second substrate layer 224B includes nonconductive fiber at a higher density than first substrate layer 224A. Also in this case, similarly to separator substrate 24C, a larger amount of conductive polymer 25 can be included in first substrate layer 224A constituting the first surface layer than in second substrate layer 224B constituting the second surface layer.

The fiber density in intermediate substrate layer 224C may be higher or lower than that in second substrate layer 224B. When the fiber density in intermediate substrate layer 224C is higher, the adhering amount of conductive polymer 25 in intermediate substrate layer 224C constituting an intermediate layer increases, conductive polymer 25 distributes widely in the thickness direction of the separator, and hence the ESR is reduced. When the fiber density in intermediate substrate layer 224C is lower, the adhering amount in intermediate layer decreases, and the withstand voltage characteristic is further improved. Therefore, the fiber density in intermediate substrate layer 224C is adjusted so as to obtain a required characteristic.

In order to change the fiber density in the thickness direction of the separator substrate as shown in separator substrates 24C and 24D, a method such as the method of changing the dispersion concentration of fiber during making the paper, or other method is employed similarly to separator substrates 24A and 24B of the first exemplary embodiment.

In those cases, by using separator substrates 24C and 24D in which the fiber density in the layer constituting first surface layer 23A is different from that in the layer constituting second surface layer 23B, the amount of the liquid agent to infiltrate into the separator substrate through first surface 231A is set to be larger than that of the liquid agent to infiltrate into the separator substrate through second surface 232A. However, the amount of the liquid agent infiltrating into the separator substrate depends on not only the density in the separator substrate, but also the concentration of conductive polymer 25 contained in the liquid agent and the compatibility between the solvent or dispersion medium and the material of the separator substrate. In consideration of these conditions, preferably, the amount of the liquid agent to infiltrate into the separator substrate through first surface 241A is set to be larger than that of the liquid agent to infiltrate into the separator substrate through second surface 242A. Thus, the ESR can be reduced.

By using separator substrate 24A and separator substrate 24B described in the first exemplary embodiment, a liquid agent containing conductive polymer 25 may be applied to first surface 241A by printing, and this liquid agent may be applied also to second surface 242A. In this case, the density of nonconductive fiber is high in first substrate layers 124P and 124A, so that the liquid agent hardly spreads in the surface direction of first surface 241A. As a result, first region 231 can be certainly formed, and the withstand voltage characteristic is improved.

Figure 12:
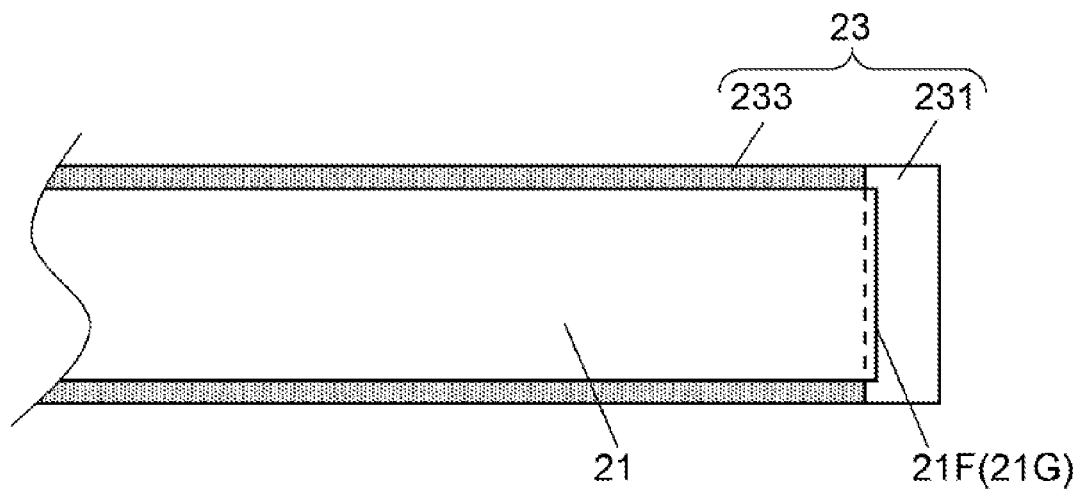
FIG. 12 is a plan view showing the positional relationship between an anode foil as the anode body and the separator in the electrical storage element in accordance with the third exemplary embodiment of the present disclosure.

The other aspects of the position of first region 231 are described with reference to FIG. 12 to FIG. 14. In the structure shown in FIG. 11, first region 231 is disposed at a position facing winding-end edge 21F of anode body 21. Alternatively, first region 231 may be disposed at a position facing winding-start edge 21G of anode body 21. First region 231 may be disposed at both of the positions. Also at winding-start edge 21F and winding-end edge 21G, a defect is apt to occur in a dielectric oxide film similarly to edges 21E along the winding direction shown in FIG. 7A and FIG. 7B. Therefore, by forming first region 231 at winding-start edge 21F and/or winding-end edge 21G, the withstand voltage characteristic can be improved. Here, in separator 23, the length of each edge 21E along the winding direction is longer than the lengths of winding-start edge 21F and winding-end edge 21G. Therefore, it is preferable that first region 231 is disposed at a position facing each edge 21E along the winding direction, and the effect of improving the withstand voltage characteristic can be enhanced.

Figure 13:
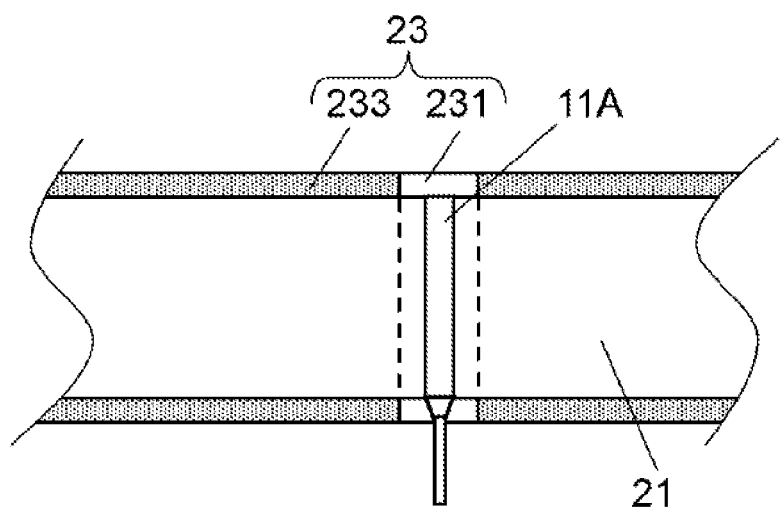
FIG. 13 is a plan view showing the positional relationship between an anode lead connected to the anode foil and the separator in the electrical storage element in accordance with the third exemplary embodiment of the present disclosure.

In the structure shown in FIG. 13, first region 231 is disposed at a position facing the connection part between anode body 21 and anode lead 11A. Anode lead 11A is connected to a predetermined position such as a vicinity of the center in the longitudinal direction of anode body 21. The connection part between anode body 21 and anode lead 11A is apt to be affected by a mechanical stress because a level difference occurs at the connection part due to the thickness of anode lead 11A. A defect such as a crack is apt to occur in the dielectric oxide film near the connection part between anode body 21 and anode lead 11A. In the dielectric oxide film that is repaired after anode lead 11A is connected to anode body 21 near the connection part, a defect such as a crack is apt to occur. Therefore, forming first region 231 at the position facing the connection part contributes to enhancing the withstand voltage characteristic greatly. The position of the connection part of anode lead 11A is not limited to this. For example, anode lead 11A may be connected to a vicinity of the winding-start edge or the winding-end edge of anode body 21. Also in this case, by forming first region 231 at the position facing the connection part of anode lead 11A, a similar effect can be produced.

Naturally, it is preferable that first region 231 is formed at two or more of the places facing edges 21E along the winding direction, winding-start edge 21F, and winding-end edge 21G. More preferably, first region 231 is formed at all of the places.

Figure 14:
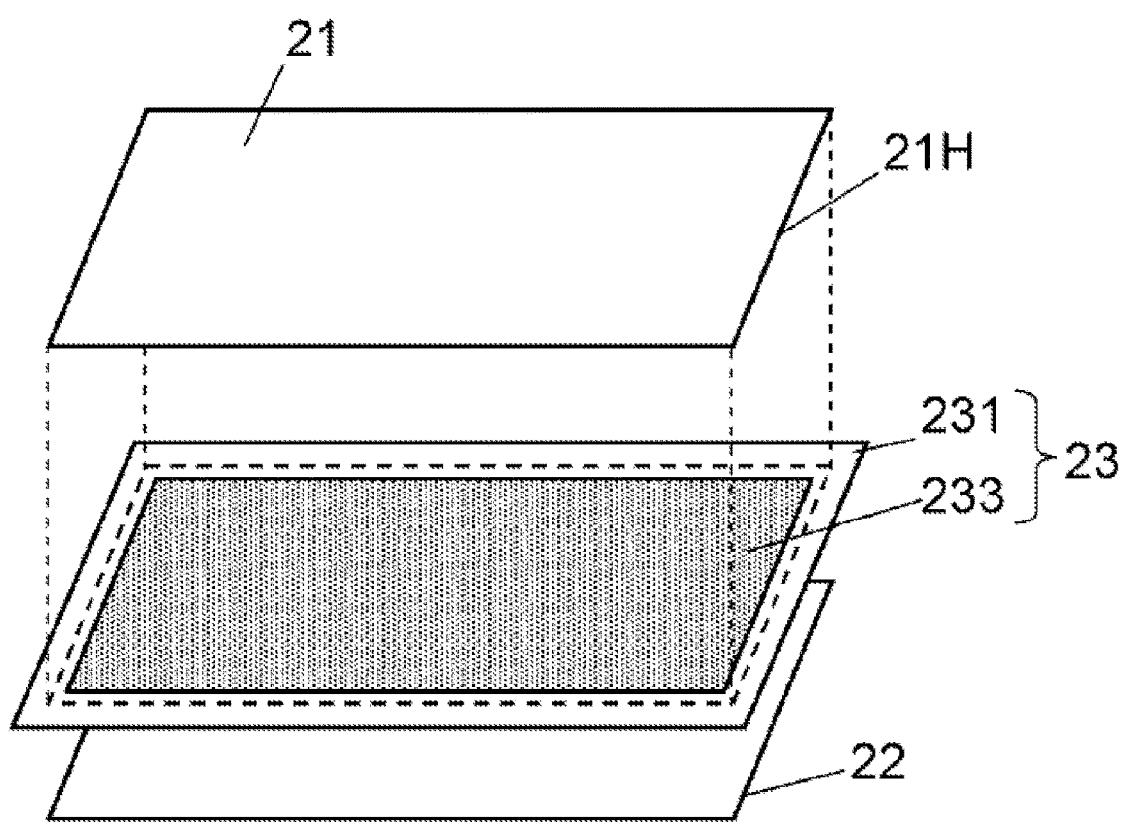
FIG. 14 is an exploded perspective view showing the positional relationship among the anode body, the separator, and the cathode body in another electrical storage element in accordance with the third exemplary embodiment of the present disclosure.

Next, the structure shown in FIG. 14 is described. In this structure, a capacitor element is formed by stacking anode body 21, separator 23, and cathode body 22. Also in this case, by forming first region 231 at a position facing edge 21I1 of anode body 21, an effect similar to that of winding-type capacitor element 12A is obtained. Also in the laminated capacitor element, first region 231 may be formed at a position facing the connection part of the anode lead.

In the first exemplary embodiment, also when first surface layer 23A does not have third region 233 but has only first region 231, first region 231 is formed at a position facing edge 21E. Therefore, the withstand voltage characteristic by edge 21E is improved.

In the above-mentioned description, the electrolytic capacitors are described as examples of the electrical storage devices, but the present disclosure is not limited to the electrolytic capacitors. For example, the present disclosure can be applied to another device using both an electrolytic solution and a conductive polymer as a solid electrolyte.

EXAMPLE

Hereinafter, specific examples of the present disclosure are described.

Example 1

First, natural fibrous paper is prepared as a separator substrate. A dispersion liquid is applied to the second surface of the separator substrate, and then the dispersion medium is volatized. In the dispersion liquid, fine particles made of a polyethylene dioxythiophene polystyrene sulfonate are dispersed in a dispersion medium. The second surface of the separator substrate is to face the cathode body. Thus, a separator is formed in which a region provided with a conductive polymer is disposed on the whole of the second surface layer. The application amount of the dispersion liquid is adjusted so that a third region provided with the conductive polymer is not formed in the first surface layer.

Next, the surface of an aluminum foil is roughened by etching, and then a dielectric oxide film is formed on the aluminum foil by anode oxidation treatment. The aluminum foil having the dielectric oxide film is prepared as an anode body. A cathode body is prepared by etching an aluminum foil.

Two above-mentioned separators are prepared, and the cathode body, the anode body, and the two separators are disposed so as to satisfy the following conditions: the cathode body faces the first surface of each separator where the conductive polymer is provided; and the anode body faces the second surface of each separator where the conductive polymer is not provided. Then, the cathode body, the anode body, and the two separators are wound to form a capacitor element.

Then, an electrolytic solution is prepared by dissolving ammonium 1,6-decanedicarboxylate in ethylene glycol. The capacitor element is immersed in the electrolytic solution under a decompression condition, and voids in the capacitor element are impregnated with the electrolytic solution.

The capacitor element in this state, and a seal member that is a molded object made of a resin vulcanized butyl rubber are inserted into a bottomed cylindrical case made of aluminum, and then the opening of the case is sealed by curling processing.

Thus, an electrolytic capacitor having a rated voltage of 450 V and a capacitance of 10 μF is produced. The diameter of the electrolytic capacitor is 10 mm, and the height thereof is 20 mm.

Example 2

Hereinafter, example 2 is described. Here, the descriptions of components similar to those in example 1 are omitted.

In example 2, the application amount of the dispersion liquid is set larger than that in example 1. Thus, as shown in FIG. 3A to FIG. 3C, a second region provided with the conductive polymer is formed in the whole of the second surface layer, and a first region that is not provided with the conductive polymer and a third region provided with the conductive polymer are formed in the first surface layer. Using such a separator, an electrolytic capacitor is produced similarly to example 1.

Comparative Example 1

Hereinafter, comparative example 1 is described. Here, the descriptions of components similar to those in example 1 are omitted.

In comparative example 1, the second region provided with the conductive polymer is formed in the whole of the second surface layer. Furthermore, the dispersion liquid is applied to the surface facing the cathode body in the separator substrate, and thus the third region provided with the conductive polymer is formed on the whole of the first surface. Using such a separator, an electrolytic capacitor is produced similarly to example 1.

Comparative Example 2

Hereinafter, comparative example 2 is described. Here, the descriptions of components similar to those in example 1 are omitted.

In comparative example 2, the dispersion liquid of the conductive polymer is not applied to the separator substrate, and hence a region provided with the conductive polymer is not formed in the first surface layer and second surface layer. Using such a separator, an electrolytic capacitor is produced similarly to example 1.

(Evaluation)

For each of example 1, example 2, comparative example 1, and comparative example 2, 20 electrolytic capacitors are produced. Of the 20 electrolytic capacitors, 10 electrolytic capacitors are used for withstand voltage measurement, and 10 electrolytic capacitors are used for ESR measurement. In order to measure the withstand voltage, a constant current of 5 mA is made to flow through the electrolytic capacitors in the atmosphere of 105° C., and a voltage at which an insulation breakdown occurs is measured. This voltage is evaluated as the withstand voltage. The ESR is measured at 100 kHz and in the environment of 20° C. after aging processing is applied to the electrolytic capacitors. Table 1 shows the measurement results. The withstand voltage values and ESR values shown in Table 1 are relative values when the values in comparative example 1 are set at 1.

TABLE 1

|  | relative value of withstand voltage | relative value of ESR |
| --- | --- | --- |
| example 1 | 1.077 | 1.375 |
| example 2 | 1.062 | 1.213 |
| Comparative example 1 | 1.000 | 1.000 |
| Comparative example 2 | 1.073 | 1.757 |

In example 1 and example 2, the withstand voltage characteristic can be made higher than that in comparative example 1 using a conventional conductive separator.

In example 2, compared with example 1, the withstand voltage characteristic slightly decreases because the first region in the first surface layer narrows, but the ESR decreases because the third region is formed in the first surface layer.

Compared with comparative example 2 using only electrolytic solution in the electrolytic capacitor, the ESR can be reduced while the withstand voltage characteristic is kept in example 1 and example 2.

The withstand voltage of the electrical storage device of the present disclosure is high. Therefore, this electrical storage device can be applied to a device such as an electrolytic capacitor that uses both an electrolytic solution and a conductive polymer as a solid electrolyte.

What is claimed is:
1. An electrical storage device comprising:
 an electrical storage element including:
  an anode body;
  a cathode body facing the anode body; and
  a separator including a separator substrate and a conductive polymer adhering to the separator substrate, and interposed between the anode body and the cathode body; and an electrolytic solution with which the electrical storage element is impregnated, wherein:

the separator includes a first surface layer having a first surface facing the anode body, and a second surface layer having a second surface facing the cathode body, the first surface layer includes a first region that is not provided with the conductive polymer, the second surface layer includes a second region provided with the conductive polymer, the first surface layer includes a third region provided with the conductive polymer, and an area, of the third region in the first surface layer, facing the anode body is smaller than an area, of the second region in the second surface layer, facing the cathode body.

2. An electrical storage device comprising:

an electrical storage element including:

an anode body;

a cathode body facing the anode body; and a separator including a separator substrate and a conductive polymer adhering to the separator substrate, and interposed between the anode body and the cathode body; and an electrolytic solution with which the electrical storage element is impregnated, wherein:

the separator includes a first surface layer having a first surface facing the anode body, and a second surface layer having a second surface facing the cathode body, the first surface layer includes a first region that is not provided with the conductive polymer, the second surface layer includes a second region provided with the conductive polymer, the first surface layer includes a third region provided with the conductive polymer, the separator includes an intermediate layer between the first surface layer and the second surface layer, the intermediate layer includes a fourth region provided with the conductive polymer, and the conductive polymer adhering to the third region in the first surface layer electrically communicates with the conductive polymer adhering to the second region in the second surface layer via the conductive polymer adhering to the fourth region in the intermediate layer.

3. The electrical storage device according to claim 1, wherein:

the anode body is formed of an anode foil including a dielectric film thereon, and the cathode body is formed of a cathode foil, the electrical storage element is a capacitor element including the anode foil and the cathode foil wound together via the separator, the anode body includes an anode lead connected to the anode foil, and the first region in the first surface layer is disposed at a position facing a connection part between the anode foil and the anode lead.

4. The electrical storage device according to claim 1, wherein:

the anode body is formed of an anode foil including a dielectric film thereon, and the cathode body is formed of a cathode foil, the electrical storage element is a capacitor element including the anode foil and the cathode foil wound together via the separator, and the first region in the first surface layer is disposed at a position facing an edge of the anode foil along a winding direction.

5. The electrical storage device according to claim 1, wherein:

the anode body is formed of an anode foil including a dielectric film thereon, and the cathode body is formed of a cathode foil, the electrical storage element is a capacitor element including the anode foil and the cathode foil wound together via the separator, and the first region in the first surface layer is disposed at at least one of a position facing a winding-start edge of the anode foil and a position facing a winding-end edge of the anode foil.

6. An electrical storage device comprising:

an electrical storage element including:

an anode body;

a cathode body facing the anode body; and a separator including a separator substrate and a conductive polymer adhering to the separator substrate, and interposed between the anode body and the cathode body; and an electrolytic solution with which the electrical storage element is impregnated, wherein the separator includes a first surface layer having a first surface facing the anode body, and a second surface layer having a second surface facing the cathode body, and an amount of the conductive polymer adhering to a first separator half-body is smaller than an amount of the conductive polymer adhering to a second separator half-body, where the first separator half-body is a portion from a center of the separator in a thickness direction to the first surface, the second separator half-body is a portion from the center of the separator in the thickness direction to the second surface.

7. The electrical storage device according to claim 6, wherein the separator substrate is made of one of paper and nonwoven fabric that include nonconductive fiber, the conductive polymer adheres to the nonconductive fiber, and the second surface layer includes the nonconductive fiber at a different density from the first surface layer.

8. The electrical storage device according to claim 7, wherein the second surface layer includes the nonconductive fiber at a higher density than the first surface layer.

9. The electrical storage device according to claim 7, wherein the first surface layer includes the nonconductive fiber at a higher density than the second surface layer.

10. The electrical storage device according to claim 6, wherein the first surface layer includes a third region provided with the conductive polymer, the second surface layer includes a second region provided with the conductive polymer, the separator includes an intermediate layer between the first surface layer and the second surface layer, the intermediate layer includes a fourth region provided with the conductive polymer, and the conductive polymer adhering to the third region in the first surface layer electrically communicates with the conductive polymer adhering to the second region in the second surface layer via the conductive polymer adhering to the fourth region in the intermediate layer.

11. The electrical storage device according to claim 7, wherein the first surface layer includes a third region provided with the conductive polymer, the second surface layer includes a second region provided with the conductive polymer, the separator includes an intermediate layer between the first surface layer and the second surface layer, the intermediate layer includes a fourth region provided with the conductive polymer, and the conductive polymer adhering to the third region in the first surface layer electrically communicates with the conductive polymer adhering to the second region in the second surface layer via the conductive polymer adhering to the fourth region in the intermediate layer.

12. The electrical storage device according to claim 6, wherein an adhering amount of the conductive polymer, which adheres to the first surface of the separator substrate, per unit area of the separator substrate is smaller than an adhering amount of the conductive polymer, which adheres to the second surface of the separator substrate, per unit area of the separator substrate.

13. The electrical storage device according to claim 7, wherein an adhering amount of the conductive polymer, which adheres to the first surface of the separator substrate, per unit area of the separator substrate is smaller than an adhering amount of the conductive polymer, which adheres to the second surface of the separator substrate, per unit area of the separator substrate.

14. The electrical storage device according to claim 10, wherein an adhering amount of the conductive polymer, which adheres to the first surface of the separator substrate, per unit area of the separator substrate is smaller than an adhering amount of the conductive polymer, which adheres to the second surface of the separator substrate, per unit area of the separator substrate.

15. The electrical storage device according to claim 11, wherein an adhering amount of the conductive polymer, which adheres to the first surface of the separator substrate, per unit area of the separator substrate is smaller than an adhering amount of the conductive polymer, which adheres to the second surface of the separator substrate, per unit area of the separator substrate.

16. An electrical storage device comprising:
an electrical storage element including:
    an anode body;
    a cathode body facing the anode body; and
    a separator including a separator substrate and a conductive polymer adhering to the separator substrate, and interposed between the anode body and the cathode body; and
an electrolytic solution with which the electrical storage element is impregnated, wherein:
the separator includes a first surface layer having a first surface facing the anode body, and a second surface layer having a second surface facing the cathode body, and
an adhering amount of the conductive polymer, which adheres to the first surface of the separator substrate, per unit area of the separator substrate is smaller than an adhering amount of the conductive polymer, which adheres to the second surface of the separator substrate, per unit area of the separator substrate.

17. The electrical storage device according to claim 16, wherein:
the separator substrate is made of one of paper and nonwoven fabric that include nonconductive fiber,
the conductive polymer adheres to the nonconductive fiber, and the second surface layer includes the nonconductive fiber at a different density from the first surface layer.

18. The electrical storage device according to claim 17, wherein the second surface layer includes the nonconductive fiber at a higher density than the first surface layer.

19. The electrical storage device according to claim 16, wherein the first surface layer includes the nonconductive fiber at a higher density than the second surface layer.

20. The electrical storage device according to claim 16, wherein the first surface layer includes a third region provided with the conductive polymer, the second surface layer includes a second region provided with the conductive polymer, the separator includes an intermediate layer between the first surface layer and the second surface layer, the intermediate layer includes a fourth region provided with the conductive polymer, and the conductive polymer adhering to the third region in the first surface layer electrically communicates with the conductive polymer adhering to the second region in the second surface layer via the conductive polymer adhering to the fourth region in the intermediate layer.

21. The electrical storage device according to claim 17, wherein the first surface layer includes a third region provided with the conductive polymer, the second surface layer includes a second region provided with the conductive polymer, the separator includes an intermediate layer between the first surface layer and the second surface layer, the intermediate layer includes a fourth region provided with the conductive polymer, and the conductive polymer adhering to the third region in the first surface layer electrically communicates with the conductive polymer adhering to the second region in the second surface layer via the conductive polymer adhering to the fourth region in the intermediate layer.

22. A manufacturing method of an electrical storage device comprising:
forming a separator having an anode facing surface and a cathode facing surface by making a conductive polymer adhere to a separator substrate having a first surface and a second surface;

producing an electrical storage element by confronting an anode with the anode facing surface of the separator and confronting a cathode with the cathode facing surface of the separator; and impregnating the electrical storage element with an electrolytic solution, wherein in forming the separator, a liquid agent that is a solution or a dispersion liquid of the conductive polymer is applied to at least one of the first surface and the second surface of the separator substrate so as to infiltrate into the separator substrate, and then a solvent or a dispersion medium included in the liquid agent is volatized.

23. The manufacturing method of the electrical storage device according to claim 22,
wherein in forming the separator, a non-application portion to which the liquid agent is not applied is disposed on the first surface, and an application portion to which the liquid agent is applied is disposed on the second surface.

24. The manufacturing method of the electrical storage device according to claim 23, wherein:
an application portion to which the liquid agent is applied is further disposed on the first surface, and the non-application portion is formed as a remaining portion other than the application portion in the first surface by partially applying the liquid agent to the first surface by printing.

25. The manufacturing method of the electrical storage device according to claim 23, wherein:
    an application portion to which the liquid agent is applied is further disposed on the first surface, and
    an area of the application portion of the first surface is set smaller than an area of the application portion of the second surface.

26. The manufacturing method of the electrical storage device according to claim 23,
    wherein the non-application portion of the first surface is formed by not applying the liquid agent to the first surface.

27. The manufacturing method of the electrical storage device according to claim 22,
    wherein an amount of the liquid agent applied to the first surface is set larger than an amount of the liquid agent applied to the second surface.

28. The manufacturing method of the electrical storage device according to claim 27,
    wherein the separator substrate is made of one of paper and nonwoven fabric that include nonconductive fiber,
    the conductive polymer adheres to the nonconductive fiber,
    the separator includes a first surface layer having the anode facing surface, and a second surface layer having the cathode facing surface, and
    the second surface layer includes the nonconductive fiber at a different density from the first surface layer.

29. The manufacturing method of the electrical storage device according to claim 27,
    wherein an amount of the liquid agent infiltrating into the separator substrate through the first surface is set larger than an amount of the liquid agent infiltrating into the separator substrate through the second surface.

* * * * *